PRIVATE BRANCH EXCHANGE SYSTEM WITH CAMP ON FACILITIES
Filed Nov. 29, 1960
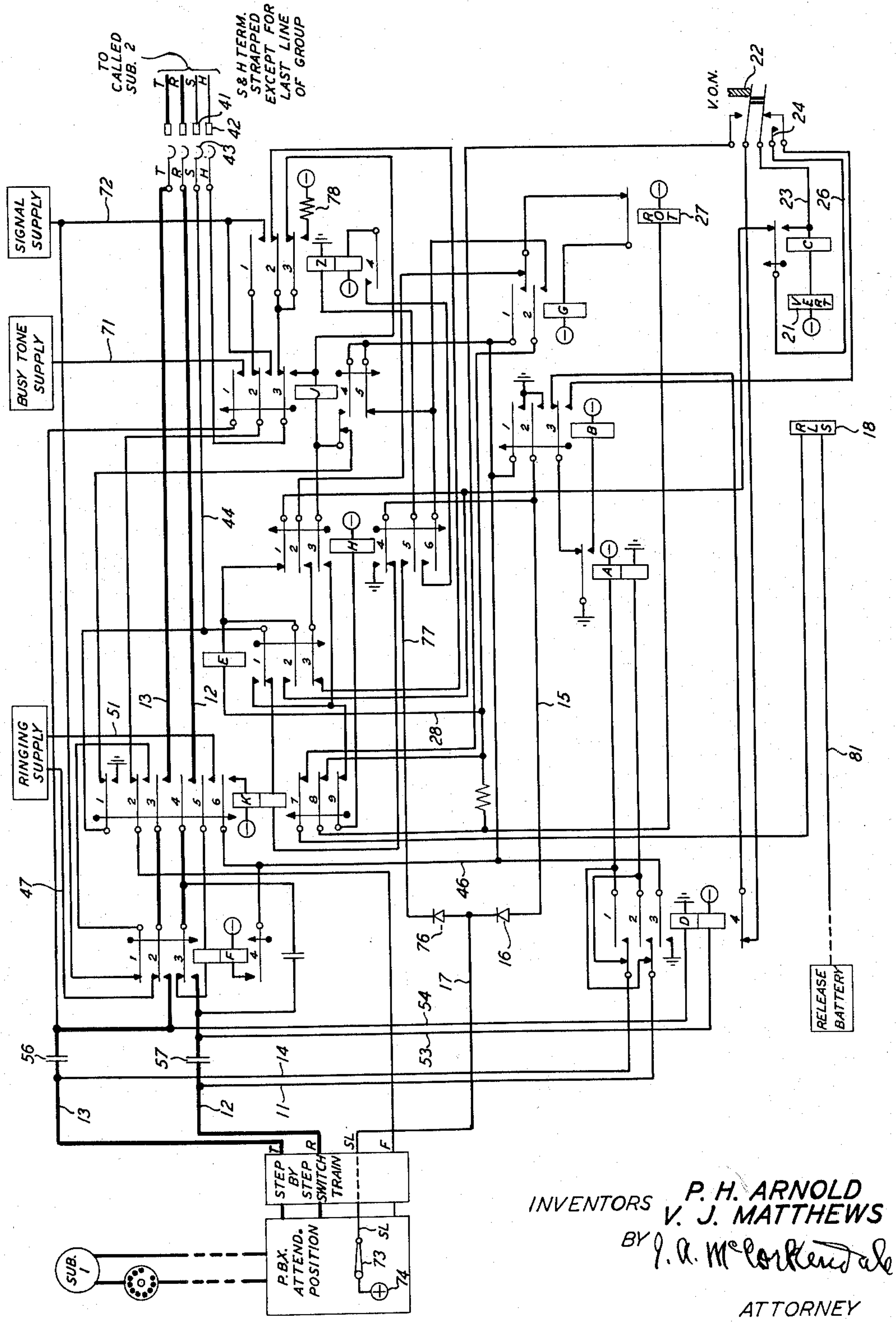
INVENTORS P. H. ARNOLD
V. J. MATTHEWS
BY J. A. McCorkendale
ATTORNEY

United States Patent Office 3,175,044

Patented Mar. 23, 1965

3,175,044

PRIVATE BRANCH EXCHANGE SYSTEM WITH CAMP ON FACILITIES

Philip H. Arnold, Wickatunk, and Vincent J. Matthews, Old Bridge, N.J., assignors to Bell Telephone Laboratories, Incorporated, New York, N.Y., a corporation of New York

Filed Nov. 29, 1960, Ser. No. 72,346

14 Claims. (Cl. 179—27)

This invention relates to a telephone system and more particularly to an automatic telephone system which includes an attended private branch exchange.

In the modern day telephone field there has been an increasing demand on the part of telephone users, particularly with regard to the business world, that the so-called "camp on" feature be made available. This camp on arrangement provides, in general, that when a connection is attempted to a called line and the called line is found to be busy, the partially completed connection is "held" until the called line becomes free whereupon the connection is completed and the called party signaled.

Many subscribers prefer this "holding" service to the alternative procedure of hanging up when a busy line is encountered and making repeated attempts until their call goes through, and, accordingly, a number of different arrangements have been developed in the past for providing the camp on feature in automatic telephone systems. These arrangements, however, have generally involved the addition of considerable wiring and equipment to existing switching circuits and have often required an additional operation on the part of the calling subscriber, for example the dialing of extra digits, in order to initiate the camp on operation. For these, and other reasons, many of the arrangements previously proposed for providing camp on facilities have not proven entirely satisfactory.

Accordingly, it is an object of our invention to improve the arrangement and operation of camp on circuits.

Another object of the invention is to simplify the wiring changes in existing telephone circuits attendant upon the addition thereto of camp on facilities.

In accordance with a specific embodiment of the invention, as applied to an automatic telephone system of the step-by-step type, a camp on relay is added to the standard step-by-step connector, which relay is operated under control of the P.B.X attendant if she wishes to camp on a busy called line after having been appraised of the busy condition by receipt of busy tone. Operation of the camp on relay is effective to apply resistance battery to a switch terminal of the busy called line (provided a previous call is not already camped on) in order to prevent a subsequent call from camping on the line, and to remove busy tone as an indication to the attendant that the call is camped on. When the called line becomes free, camp on is removed and ringing current is applied to the called line.

In the connector circuit ground potential is applied, as is customary, to the sleeve lead to maintain operated the switches in the switch train between the attendant's position and the connector. In accordance with an aspect of our invention, this same sleeve lead is utilized for operation of the camp on relay, the attendant causing application of a positive signal, such as a 10 volt positive potential, to the sleeve lead. This positive potential is applied, accordingly, in the opposite direction to the normal ground, i.e., from the attendant's position through the switch train to the connector, and is coexistent with it. In the connector a diode network isolates the positive signal from the normal sleeve lead and applies it to the camp on relay to operate that relay.

It is to be recalled that in normal telephone usage two potentials are applied, a ground potential and a negative potential. We therefore utilize a more positive signal on the sleeve lead, than the normal ground, to operate the camp on relay. If a telephone system were to utilize, as its two normal potentials, ground and a positive potential, then, in accordance with the concept of our invention, a more negative signal would be applied to the sleeve lead.

A feature of the invention is the application of the operating potential for the camp on relay over a lead already present in the connector and used therein for a separate function. This avoids any undue complication of the connector by the addition thereto of the camp on arrangement. In substance, the novel arrangement contemplated by the invention is such that provision of efficient camp on facilities is attained merely by the addition of a single relay to the standard connector circuit and a slight modification in the jack sleeve lead.

Another feature of the invention is a diode network in the dual function control lead whereby to separate the positive potential from sleeve ground on the lead and to divert the positive potential to the operating winding of the camp on relay.

A full understanding of the arrangement contemplated by the present invention as well as an appreciation of the various advantageous features thereof may be gained from consideration of the following detailed description in connection with the accompanying drawing which shows one specific illustrative embodiment of the invention applied to a step-by-step connector.

Referring now to the drawing, the circuit illustrated in detail, i.e., excepting the portions added in accordance with the features of the present invention, is that of a standard step-by-step local connector with rotary hunting. Such circuits are well known in the telephone switching art, and a connector circuit of the same general type is shown, for example, in United States Patent 1,925,681, September 5, 1933, of Messrs. S. Uda and T. Okura.

The type of hunting connector illustrated is ordinarily utilized where terminals of P.B.X extension lines are grouped, say in groups of ten, the S and H leads being strapped together on all lines of the group except the last line thereof. Thus, if the first terminal of a P.B.X group called is busy, the contact wipers will be moved (by circuit operations described in detail below) from the terminal found busy and will be stepped along the other terminals of the group until either an idle line is found or until the last line of the group is reached where the S and H terminals are not strapped.

It is believed that the novel camp on arrangement contemplated by our invention can best be described if the overall operation of the connector as a whole be described in connection with an incoming call from Sub. No. 1. It will be assumed that the call referred to is an "attendant supervised" call, that is, the call, after passing through the main central office, passes through the attendant's position of the P.B.X and its progress is monitored by the attendant; the call passes through the normal step-by-step switch train to the connector circuit which is shown in detail.

*Seizure and stepping*

When the illustrated connector is seized by a selector in the usual manner involving dialing of the first digits by the calling subscriber, relay A operates over a path from battery, upper winding of relay A, No. 2 break contact of relay D, lead 11, ring conductor 12, closed loop at calling station No. 1, tip conductor 13, lead 14, No. 1 break contact of relay D, lower winding of relay A to ground. Relay A, operated, completes an obvious operating path for relay B.

Relay B, upon operating, supplies ground from its No. 2 make contact through branch lead 15 and diode 16 to the main portion of sleeve lead 17. This ground is effective to hold the switches in the train in their operated position. It will be noted that diode 16 is poled to permit passage of this ground to the main portion of lead 17.

Operation of relay B also opens at its No. 3 break contact a partially completed release path through release magnet 18, which will be traced subsequently, partially completes at its No. 3 make contact an operating path for vertical magnet 21, and partially completes certain holding paths which will be described subsequently.

Now as the calling subscriber dials the next digit of the called number, relay A releases and reoperates in step with the resulting transmitted impulses. Upon the first release of relay A, a path is completed for operation of vertical magnet 21 and relay C, this path being from ground on the break contact of relay A, No. 3 make contact of relay B, break contact of vertical off-normal switch 22, windings of relay C and vertical magnet 21 to battery. When the first vertical step is taken, by action of vertical magnet 21, the above path for vertical magnet 21 is changed from the break contact of vertical off-normal switch 22 and lead 23 to the lower make contact 24, lead 26, make contact and winding of relay C, through winding of vertical magnet 21 to battery. This path is maintained, due to the slow-to-release characteristic of relay C, during the time the succeeding pulses of the digit dialed step the brushes of the connector to the desired vertical position. As soon as the series of impulses ends, relay C releases and will not again reoperate due to the above referred to change in the operating path at contacts of vertical off-normal switch 22.

Now when the final digit is transmitted by operation of the dial at the calling station, the first impulse will cause operation of rotary magnet 27 and relay E over a path traced from battery, winding of rotary magnet 27, No. 8 break contact of relay K, lead 28, winding of relay E, No. 1 break contact of relay H, break contact of relay C, lead 26, make contact 24 of vertical off-normal switch 22, No. 3 make contact of relay B, break contact of relay A to ground. (Relay B remains operated during the pulsing, and resultant intermittent operation of relay A, due to its slow-to-release characteristic). During the succeeding dialed impulses, rotary magnet 27 will step the brushes of the connector in a rotary direction until the terminals of the called line are reached. During this time relay E operates in step with the rotary magnet and closes a circuit to be described subsequently for testing the called line. Also, relay E, operated, holds the pulsing circuit closed, through its No. 2 make contact, in the event relay H operates when a busy line is passed over.

*Rotary hunting*

Assuming now that the first terminal of the called P.B.X group is busy, ground will be applied to the S terminal 41 through normal operation of the called line circuit. For example, the ground may be applied through operation of a relay as disclosed in S. Uda et al. Patent 1,925,681 referred to above. Since, as previously pointed out, the S and H terminals of all lines of a group, except the last line, are strapped, the guarding ground potential applied to the S terminal 41 of the busy line will also be applied to the H terminal 42.

The ground potential on the S terminal 41 of the line group and brush 43 of the step-by-step connector switch will cause operation of relay H over a path including lead 44, No. 1 make contact of relay E, No. 9 break contact of relay K, winding of relay H to battery. Relay H, operated, will lock up upon the release of relay E at the end of the dialed pulses, over a path from battery, winding of relay H, No. 9 break contact of relay K, No. 3 make contact of relay H, No. 4 break contact of relay J, No. 1 break contact of relay K, lead 44 to the guarding ground potential on S terminal 41.

With relay H operated and relay E released, a path is completed for operating relay G, traced from battery, winding of relay G, break contact of rotary magnet 27, No. 1 break contact of relay G, No. 2 make contact of relay H, No. 3 break contact of relay E, No. 2 break contact of relay Z, No. 3 break contact of relay J, to ground on H terminal 42 which, as stated above, is strapped to S terminal 41. Upon operation of relay G an energizing path is completed for rotary stepping magnet 27. This path is traced from battery, winding of rotary magnet 27, No. 8 break contact of relay K, No. 2 make contact of relay G, No. 5 break contact of relay J, No. 1 makes contact of relay B to ground. As rotary magnet 27 operates to move the switch wipers from the line terminal found busy, the operate path for relay G will be opened at the break contact of stepping magnet 27 and relay G will release.

Relay G, operated, will open the operating path for rotary stepping magnet 27. However, if the S and H wiper brushes of the switch still find a busy line terminal, relay H will remain operated (over the path described above) and relay G will again operate to complete the energizing path for rotary magnet 27 and step the switch brushes to the next line terminals.

This stepping operation will continue until either an idle line in the group is found or until the last line in the group is contacted. Here the S and H terminals are not strapped.

*Cut through and ringing*

Assuming, first, that an idle line is found in the called, group, relay K will partially operate from battery applied to the S terminal of the idle line through normal functioning of the line circuit, lead 44, No. 1 break contact of relay E, lower winding of relay K, No. 4 break contact of relay H (now released), No. 2 make contact of relay B to ground. This ground acts as a guarding potential on the S lead until relay K operates and applies ground thereto through its No. 1 make contact. The above operation of relay K through its lower winding is only partial in that only its No. 6 make contact is closed. However, this completes a path for full operation of the relay traced from battery, upper winding and No. 6 make contact of relay K, lead 46, No. 1 make contact of relay B to ground. Relay K remains operated until the connector releases. Relay K, operated, connects ringing lead 47 through break contact No. 2 of relay F and make contact No. 3 of relay K to tip conductor 13 and connects ringing lead 51 through make contact No. 5 of relay K, upper winding and No. 3 break contact of relay F, No. 4 make contact of relay K to ring conductor 12 whereby to transmit ringing current to the substation ringer of the called station.

The ringing will continue until the subscriber at the called substation responds by removing his handset and closing the line loop at his station. Relay F will then partially operate to close its make contact No. 4 due to the current flow in its upper winding. Closure of make contact No. 4 completes a path through its lower winding effective to fully operate relay F, this path being over lead 46 to ground on No. 1 make contact of relay B.

Relay F, operated, removes the ringing current from the called station, connects the tip and ring conductors over respective leads 53 and 54 to the windings of relay D, which supplies talking battery to the called station, and connects the called and calling stations for talking purposes through capacitors 56 and 57.

Relay D, when operated, reverses battery and ground to the calling end for registration or supervision.

*All lines of group found busy*

Let us assume now that in the above-described rotary stepping operation no idle line was found and that when the last line of the group was reached (where the S and H) terminals are not strapped together) the S lead was found grounded due to the busy condition of the line;

relay H will remain operated but relay G will not again operate since the H terminal is not grounded.

During the hunting operation previously described, relay J remained in released position since its operating path is in series with relay G and the ground previously on terminal H, while serving to operate relay G, shunted the operating path for relay J. Now that the ungrounded H terminal has been reached, however, relay J operates over a path from battery, winding of relay G, break contact of rotary stepping magnet 27, No. 1 break contact of relay G, No. 2 make contact of relay H, No. 3 break contact of relay E, No. 2 and No. 3 break contacts of relay Z, winding and No. 4 break contact relay J, No. 1 break contact of relay K, lead 44, wiper contact 43 to ground on the S line terminal 41. Relay J, upon operating, locks over its No. 4 make contact to ground on No. 1 make contact of relay B. Relay H is now also held operated to this same ground over a path from battery, winding of relay H, No. 9 break contact of relay K, No. 3 make contact of relay H, No. 4 make contact of relay J, to ground on No. 1 make contact of relay B.

Relay J, upon operating, supplies busy tone from a source connected to lead 71, No. 1 make contact of relay J, through capacitor 56 and over tip conductor 13 to the P.B.X attendant, and also connects an intermittent signal, if required, from a source connected to lead 72, No. 2 make contact of relay J, No. 2 break contact of relay K, to the F lead.

*Camp on applied*

It will be assumed now that the attendant, having been apprised by receipt of the busy tone, that all lines in the P.B.X group are busy, wishes to have the incoming call camp on for completion as soon as the called line becomes free. Accordingly, she will close a key provided at her position, indicated schematically as key 73, this action being effective to connect 10 volt positive potential from source 74 to the jack sleeve lead 17 of the connector. Now it will be recalled that lead 17 in line with its normal function in the connector circuit is presently carrying ground from No. 2 make contact of relay B. However, in accordance with the novel features of the present invention an isolation network comprising diodes 16 and 76 is provided which is effective to isolate this positive potential from the sleeve ground and to supply it over auxiliary lead 77, through make contact No. 5 of operated relay H, upper winding of relay Z to ground. Relay Z, which may aptly be referred to as the "camp on relay," operates over this path whereby to permit the connector to "test" the H lead of the busy station. Assuming that the H lead is open indicating that no other call is camped on or testing the busy station line (as will be apparent from the immediately following description), the J. relay will release since its previously traced operating path is opened at the No. 2 and No. 3 break contacts of relay Z.

The J relay, released, completes a holding path for relay Z traced from battery, lower winding and No. 4 bake contact of relay Z, No. 6 make contact of relay H, No. 5 break contact of relay J, to ground on the No. 1 make contact of relay B. Also relay J released completes a path for application of resistance battery to terminal H. this path being from battery, resistor 78, make contact No. 3 of relay Z, break contact No. 3 of relay J to switch wiper H. This prevents subsequent calls from camping on the called line while the immediate call is camped on since the involved relay will not release unless the H terminal is open. Also, relay J, upon releasing, removes at its No. 1 make contact the busy tone previously supplied from lead 71 to tip 13. This is an indication to the attendant supervising the call that it has been camped on.

When the called line becomes free, the ground on the S line terminal is replaced by battery in accordance with the normal functioning of the line circuit. This releases relay H (since battery is now connected to both ends of the previously operating path therefor) and operates relay K over a path from battery, S switch wiper 43, lead 44, break contact No. 1 of relay E, lower winding of relay K, No. 4 break contact of relay H, No. 2 make contact of relay B to ground.

Relay H, released, opens at its No. 6 make contact the holding path for relay Z which thereupon releases and removes the camp on condition. The K relay, operated, functions as above described to connect ringing current to the called line and the call is cut through as previously described.

*Disconnect*

If the called party disconnects first, relay D releases, and when the calling station then disconnects, relays A and B will release and ground will be removed from the sleeve lead 17 allowing the switches of the train back of the connector to return to normal. Relays F and K, which were held operated to ground on a make contact of relay B, will release and release magnet 18 will be energized to return the shaft to its normal position. The energizing path for release magnet 18 is traced from battery, release lead 81, winding of release magnet 18, break contact No. 7 of relay K, contact springs of vertical off-normal switch 22, No. 4 break contact of relay D, No. 3 break contact of relay B, break contact of relay A to ground.

If the calling party disconnects before the called party, relay D will remain operated and will, in turn, hold relays F and K operated by ground applied to lead 46 through its No. 3 make contact. Relays A and B release when the calling party disconnects and a pulse will be sent to relay E due to the slow release of relay B as compared with relay A. Relay E will operate momentarily to remove the ground from the S lead 44 which would otherwise be applied through the lower winding of relay K and No. 1 break contact of relay E. This momentary opening of the path will allow the switches in the chain back of the connector to release and upon the release of relay E, a guarding potential will be applied over S lead 44 through the path mentioned.

It will be apparent from the above description that the novel arrangement contemplated by the invention provides camp on without materially changing the normal operation of the connector and without complication thereof by the addition of any substantial amount of equipment or wiring. No additional operation is required by the calling subscriber and only a simple key operation on the part of the attendant is required.

While a specific embodiment of the invention has been selected for detailed disclosure, the invention is not, of course, limited in its application to the embodiment disclosed. The embodiment which has been described should be taken as illustrative rather than restrictive thereof.

What is claimed is:

1. In a telephone system, a first station line, a second station line, switching means for completing a connection from said first station line to said second station line provided said second station line is free of other calls, a lead included in said switching means normally having ground connected thereto while and switching means is in use in establishing and maintaining a connection between said lines, means operative when said second station line is in busy condition for partially completing and holding in that condition a connection from said first line to said second line before said second line becomes free, said last-mentioned means including a relay having an operating winding, a source of positive potential, means for applying a positive potential from said source to said lead, and a diode network associated with said lead effective to segregate said positive potential from the connected ground and apply it to the operating winding of said relay whereby to operate said relay.

2. In a telephone system comprising a main exchange and a private branch exchange, an attendant's position at said private branch exchange, a first station line, a second station line, switching apparatus including a connector circuit at said branch exchange for completing a connection from said first line to said second line if said second line is free of other calls, means included in said connector circuit operative when said second line is in busy condition for partially completing and holding in that condition a connection from said first line to said second line before said second line becomes free, means for completing said connection when said second line becomes free, said partially completing means including a relay having an operating winding, a lead in said connector circuit having ground connected thereto while said connector circuit is in seized condition, means at said attendant's position for applying a positive potential to said grounded lead, and means connected to said lead for segregating said positive potential from the connected ground and applying it to the operating winding of said relay whereby to operate said relay.

3. In a telephone system, a calling station line and a called station line, switching means for completing a connection from said calling station line to said called station line provided said called station line is free of other calls, means for partially completing the holding in that condition a connection between said calling and said called line if said called line is busy, said last-mentioned means including a relay having an operating winding and effective when operated to apply a guarding potential to terminals of the busy called line, a first lead included in said switching means normally having ground connected thereto while said switching means is in use in establishing and maintaining a connection between said lines, a second lead joined between said first lead and the operating winding of said relay, a source of positive potential, means for applying a positive potential from said source to said first lead and partially thereover to said second lead and said operating winding, and isolating means connected at the junction of said first and said second leads whereby to isolate the positive potential from the ground connected to said first lead.

4. In a telephone system, a calling station line, a called station line, switching means for completing a connection from said calling line to said called line provided said called line is free of other calls, means for partially establishing and holding in that condition a connection between said calling line and said called line if said called line is busy, said last-mentioned means including a relay having an operating winding, a lead included in said switching means having a main portion and two branch portions joined thereto, the first of said branch portions normally having ground connected thereto while said switching means is in use in establishing and maintaining a connection between said lines, the second of said branch portions being connected to said operating winding, means for applying a positive potential to said main portion of said lead, and isolating means connected at the junction point of said main portion and said branch portions whereby to isolate said positive potential from said first branch while applying it over said second branch to said operating winding.

5. In a telephone system, a calling station line, a called station line, switching means for completing a connection from said calling line to said called line provided said called line is free of other calls, means for partially establishing and holding in that condition a connection between said calling line and said called line if said called line is busy, said last-mentioned means including a relay having an operating winding, a lead included in said switching means having a main portion and two branch portions joined thereto, the first of said branch portions normally having ground connected thereto while said switching means is in use in establishing and maintaining a connection between said lines, the second of said branch portions being connected to said operating winding, means for applying a positive potential to said main portion of said lead, and a diode network connected at the junction point of said main portion and said branch portions whereby to isolate said positive potential from said first branch while applying it over said second branch to said operating winding.

6. In a telephone system comprising a main exchange and a private branch exchange, an attendant's position at said branch exchange, a calling line, a called line associated with said private branch exchange, switching means including a connector at said private branch exchange for completing a connection from said calling line to said called line provided said called line is free of other calls, means also at said private branch exchange for partially completing, and holding in partially completed condition, a connection between said lines if said called line is busy, said last-mentioned means including a relay having an operating winding and effective when operated to connect a guarding potential to a terminal of the busy called line, one side of said operating winding having ground connected, a control lead terminating at one end at said attendant's position and at the other end in said connector, said lead normally having ground connected at said other end while said connector is in seized condition, an auxiliary lead having one end joined to said control lead intermediate the ends thereof and having the other end connected to the other side of the operating winding of said relay, means at said attendant's position for applying a positive potential to said control lead, and means for diverting said positive potential into said auxiliary lead for application to the operating winding of said relay and for isolating the ground connected to said operating winding from said control lead.

7. In a telephone system comprising a main exchange and a private branch exchange, an attendant's position at said branch exchange, a calling line, a called line associated with said private branch exchange, switching means including a connector at said private branch exchange for completing a connection from said calling line to said called line provided said called line is free of other calls, means also at said private branch exchange for partially completing, and holding in partially completed condition, a connection between said lines if said called line is busy, said last-mentioned means including a relay having an operating winding and effective when operated to connect a guarding potential to a terminal of the busy called line, a control lead terminating at one end of said attendant's position and at the other end in said connector, said lead normally having ground connected at said other end while said connector is in seized condition, an auxiliary lead having one end joined to said control lead intermediate the ends thereof and having the other end connected to one side of the operating winding of said relay, the other end of said winding having ground connected thereto, means at said attendant's position for applying a postive potential to said control lead, and isolating means connected at the junction of said auxiliary lead and said control lead for isolating the positive potential from the portion of said control lead terminating in said connector while applying the positive potential over said auxiliary lead to said operating winding whereby to operate said relay, and for isolating said ground connected to said operating winding from said control lead.

8. In a telephone system comprising a main exchange and a private branch exchange, an attendant's position at said branch exchange, a calling line, a called line associated with said private branch exchange, switching means including a connector at said private branch exchange for completing a connection from said calling line to said called line provided said called line is free of other calls, means also at said private branch exchange for partially completing, and holding in partially completed condition, a connection between said lines if said called line is busy, said last-mentioned means including a relay having an operating winding and effective when operated to connect a guarding potential to a terminal of the busy called line, one side of said operating winding having ground connected thereto, a control lead terminating at one end at said attendant's position and at the other end in said connector, said lead normally having ground connected at said other end while said connector is in seized condition, an auxiliary lead having one end joined to said control lead intermediate the ends thereof and having the other end connected to the other side of the operating winding of said relay, means at said attendant's position for applying a positive potential to said control lead, and a diode network connected at the junction of said auxiliary lead and said control lead for isolating the ground connected to said operating winding from said control lead and for isolating said positive potential from the portion of said control lead terminating in said connector while applying the positive potential over said auxiliary lead to the operating winding of said relay whereby to operate said relay.

9. In a telephone system a called line, a connector circuit and a switch train including a sleeve lead for establishing connections to said called line, said connector circuit including means for applying a ground potential to said sleeve lead for maintaining operated said switch train and also including a camp on relay, and means for applying a positive potential to said sleeve lead through said switch train to said connector circuit to operate said camp on relay.

10. In a telephone system, a called line, an attendant's position, a switch train including a sleeve lead and a connector circuit interconnecting said attendant's position and said called line, said connector circuit including means for applying a ground potential to said sleeve lead for maintaining operated said switch train and also including a camp on relay, and means at said attendant's position for applying a positive potential to said sleeve lead through said switch train to said connector circuit to operate said camp on relay.

11. In a telephone system, the combination set forth in claim 10 further comprising means for applying a busy signal to said attendant's position when said called line is busy and means for removing said busy signal on operation of said camp on relay.

12. In a telephone system, the combination set forth in claim 11 further comprising means for preventing operation of said busy signal removing means on subsequent calls to said called line and operation of said means at said attendant's position for applying positive potential to said sleeve lead when said camp on relay is already operated.

13. A telephone system comprising a branch exchange including an attendant's position, a called line, switch means for establishing connections between said called line and said branch exchange, said switch means including a sleeve lead, means for applying ground potential to said sleeve lead for maintaining said switch means operated, a camp on relay having an operating winding with ground connected to one side thereof, means for applying a positive potential at said attendant's position to said sleeve lead to operate said camp on relay, and means for separating said ground and said positive potential coexistent on said sleeve lead and for isolating therefrom the ground connected to said operating winding.

14. A telephone system in accordance with claim 13 further characterized in that said last-mentioned means comprises a diode network.

References Cited by the Examiner

FOREIGN PATENTS 1,245,205 9/60 France.

ROBERT H. ROSE, *Primary Examiner.*

WALTER L. LYNDE, L. MILLER ANDRUS, *Examiners.*